(12) United States Patent
Hidaka

(10) Patent No.: US 8,588,804 B2
(45) Date of Patent: Nov. 19, 2013

(54) COMMUNICATION TERMINAL

(75) Inventor: Hiroyuki Hidaka, Kawasaki (JP)

(73) Assignee: Kyocera Corporation, Kyoto (JP)

( * ) Notice: Subject to any disclaimer, the term of this patent is extended or adjusted under 35 U.S.C. 154(b) by 331 days.

(21) Appl. No.: 10/970,225

(22) Filed: Oct. 21, 2004

(65) Prior Publication Data
US 2005/0090254 A1   Apr. 28, 2005

(30) Foreign Application Priority Data
Oct. 27, 2003 (JP) ................................ 2003-366083

(51) Int. Cl.
*H04W 4/00* (2009.01)
*H04W 74/00* (2009.01)

(52) U.S. Cl.
USPC ........................................ 455/455; 455/435.1

(58) Field of Classification Search
USPC .............. 455/452.2, 450–454, 455, 410, 434, 455/435.1–435.3, 515, 516, 450–452.1, 455/67.11; 370/431–463, 230, 329
See application file for complete search history.

(56) References Cited

U.S. PATENT DOCUMENTS

| | | | |
|---|---|---|---|
| 5,276,911 A * | 1/1994 | Levine et al. | 455/510 |
| 5,673,259 A * | 9/1997 | Quick, Jr. | 370/342 |
| 6,477,373 B1 * | 11/2002 | Rappaport et al. | 455/436 |
| 6,970,710 B1 | 11/2005 | Kikuchi | |
| 6,996,060 B1 * | 2/2006 | Dahlby et al. | 370/230 |
| 2003/0145091 A1 * | 7/2003 | Peng et al. | 709/229 |
| 2003/0223427 A1 * | 12/2003 | Chang et al. | 370/395.3 |
| 2004/0198302 A1 * | 10/2004 | Hutchison et al. | 455/343.1 |
| 2004/0203771 A1 * | 10/2004 | Chang et al. | 455/435.1 |

FOREIGN PATENT DOCUMENTS

| | | |
|---|---|---|
| JP | 2001036460 A | 2/2001 |
| JP | 2003-092782 | 3/2003 |
| WO | 02087268 A1 | 10/2002 |

OTHER PUBLICATIONS

"Interoperability Specification (IOS) for High Rate Packet Data (HRPD) Access Network Interfaces—Rev A.", 3GPP2A.S0007-A v1.0.
ARIB STB-T64-C.S0024 v4.0, "cdma2000 High Rate Packet Data Air Interface Specification", Industrial Property Rights (IPR).
Japanese language office action and its English language translation for corresponding Japanese application 2003366083 lists the references above.
Japanese language office action (official inquiry) dated May 10, 2011 and its English language translation for corresponding Japanese application 2003366083.

* cited by examiner

*Primary Examiner* — George Eng
*Assistant Examiner* — Nam Huynh
(74) *Attorney, Agent, or Firm* — DLA Piper LLP (US)

(57) ABSTRACT

A communication terminal of the invention confirms, first, a reception error occurrence rate of received signals when communication connection (channel connection) with a base station has not established. When the reception error occurrence rate is below a predetermined value, requests for communication connection with respect to the base station are repeated, the number of which is counted. Then, when the counted number has exceeded a predetermined value, re-assignment of terminal identification information is requested of the base station.

3 Claims, 5 Drawing Sheets

COMMUNICATION TERMINAL

PRIORITY CLAIM

Priority is claimed on Japanese Patent Application No. 2003-366083, filed Oct. 27, 2003, the content of which is incorporated herein by reference.

BACKGROUND OF THE INVENTION

1. Field of the Invention

The invention relates to a communication terminal in a radio communication system such as a mobile communication system, and particularly to a communication terminal in a radio communication system, in which a base station assigns terminal identification information to individual communication terminals (for example, portable phones) in its area, which are to be distinguished from one another, to make connections of communication channels.

2. Description of Related Art

To distinguish communication terminals (called "terminals" hereunder) from one another, various kinds of systems have been proposed that dynamically allocate a terminal identifier which is effective for a limited period of time. There is a system in which as a terminal identifier such as a DHCP (Dynamic Host Configuration Protocol) protocol of RFC (Requests For Comments) 2131, an IP (Internet Protocol) address is given, or a system in which an UATI (Unicast Access Terminal Identifier) is used as a terminal identifier such as HRPD (High Rate Packet Data) that is standardized in 3GPP2 (3rd Generation Partnership Project 2) in a radio environment.

In a system in which a terminal identifier is utilized to identify these kinds of individual terminals, when a disagreement occurs in an identifier assigned to a terminal and a radio communication base station (called a "base station" hereunder), an interrupted condition for communication occurs because of failure to recognize the individual terminals. In order to overcome the interrupted condition for communication, a limitation on effective time for the identifier is set. To be specific, an effective time limit is provided for each process of communication protocols. When the process has not been completed within the time limit, the identifier is invalidated. Alternatively, when the identifier is confirmed on the side of the base station and is determined to be invalid, a process of re-assignment of an identifier is conducted.

The HRPD is disclosed, for example, in Japanese Patent Publication No. 2003-92782.

The method of improving the state by providing an effective time limit for the terminal identifier as shown above has the following problems. That is, with respect to a system using a radio environment such as the HRPD, base stations and terminals are required to reduce traffic from the point of view of efficient use of radio resources. For that reason, since a method of reducing a period of time for interrupted conditions by shortening an effective period of time for the terminal identifier brings about an increase in communication traffic, this is not desirable.

It is effective for a base station to detect an invalid identifier. However, since all the base stations with which a terminal communicates are required to implement this function, in the case in which a connection is established between a base station that does not respond to the function, proper recovery of communication conditions is not carried out, which is a problem.

SUMMARY OF THE INVENTION

The invention was made in order to solve these problems. An objective of the invention is to provide a communication terminal that can overcome interruption condition of communication. When, in a radio communication environment, a connection failure in a channel, such as communication interruption, between the communication terminal and a base station takes place, the communication terminal determines whether or not disagreement of a terminal identifier (for example, a UATI) is responsible for the connection failure. In a case where terminal identification information disagrees, the terminal identifier currently in use is discarded to recover from the connection fault, and then new terminal identification information is secured.

The invention was made to resolve the above-mentioned issue. The invention is directed to a communication terminal in a radio communication system in which communication connection is performed between a base station and each communication terminal in the service area thereof, by assigning terminal identification information for distinguishing each communication terminal. The communication terminal of the invention comprises a communication connection request transmission unit for transmitting a communication connection request to the base station; and a terminal identification information reassignment request unit for requesting reassignment of the terminal identification information to the base station, when no response of information necessary for communication connection from the base station is received with respect to the communication connection request.

According to this, connection failure, which is caused by a disagreement of the terminal identification information, can be solved. Even when failure takes place in the terminal identification information inside of the base station, the processing of the terminal can solve the failure. Since the invention utilizes the function of the conventional communication terminals, the invention can be realized at a low cost.

A communication terminal of the invention further comprises a reception error occurrence rate confirm unit for confirming a reception error occurrence rate of a received signal when communication connection with the base station is not completed, wherein when the reception error occurrence rate is below a predetermined value, the terminal identification information re-assignment request unit requests re-assignment of the terminal identification information to the base station.

This distinguishes between a disagreement of the terminal identification information and an undesirable reception signal environment, as the reasons for incomplete communication connection (channel connection). Connection failure caused by a disagreement of the terminal identification information can be solved. Even when failure occurs in the terminal identification information inside of the base station, the processing of the terminal can solve the failure.

A communication terminal of the invention further comprises a reception error occurrence rate confirm unit for confirming a reception error occurrence rate of a received signal when communication connection with the base station is not completed; a connection request repetition unit for repeating a communication connection request to the base station when the reception error occurrence rate is below a predetermined value; and a connection request count unit for counting a number of connection requests by the connection request repetition unit, wherein the terminal identification information re-assignment request unit requests reassignment of the terminal identification information to the base station when the counted number by the connection request count unit exceeds a predetermined value.

According to this, it is confirmed that a disagreement of the terminal identification information is responsible for incomplete communication connection (channel connection). The connection failure caused by a disagreement of the terminal identification information can be solved. Even when failure happens in the terminal identification information inside of the base station, the processing of the terminal can overcome the failure.

The communication terminal of the invention transmits a connection request for communication connection (channel connection) to the base station. When the communication connection is not completed for the reason that information necessary for the communication connection is not transmitted from the base station, the communication terminal sends out a re-assignment request of terminal identification information (such as a UATI) to the base station to acquire new terminal identification information.

According to this, connection failure, which is caused by a disagreement of the terminal identification information such as a terminal identifier caused by a radio environment, can be solved mainly by the terminal. Even when failure takes place in the terminal identification information inside of the base station, the processing of the terminal can likewise solve the failure. Since the invention utilizes the function of the conventional communication terminals, the invention can be realized at a low cost without using new hardware sources.

In a case where communication connection (channel connection) with the base station is not completed, the communication terminal of the invention measures a reception error occurrence rate of a received signal. When the reception error occurrence rate is below a predetermined value, the communication terminal makes a request of re-assignment of the terminal identification information to the base station.

This distinguishes between a disagreement of the terminal identification information and an undesirable reception signal environment, as the reasons for incomplete communication connection (channel connection). Connection fault caused by a disagreement of the terminal identification information can mainly be solved by the terminal. Even when failure occurs in the terminal identification information inside of the base station, the processing of the terminal can solve the failure.

In a case where communication connection (channel connection) with the base station is not completed, the communication terminal of the invention measures a reception error occurrence rate of a received signal. When the reception error occurrence rate is below a predetermined value, the communication terminal sends out repeated communication connection requests to the base station and counts the number of repetitions. When the number exceeds a predetermine value, reassignment of the terminal identification information is requested to the base station.

According to this, it is confirmed that a disagreement of the terminal identification information is responsible for incomplete communication connection. The connection failure caused by a disagreement of the terminal identification information can be solved mainly by the terminal. Even when failure happens in the terminal identification information inside of the base station, the processing of the terminal can overcome the failure.

DETAILED DESCRIPTION OF THE INVENTION

Figure 1:
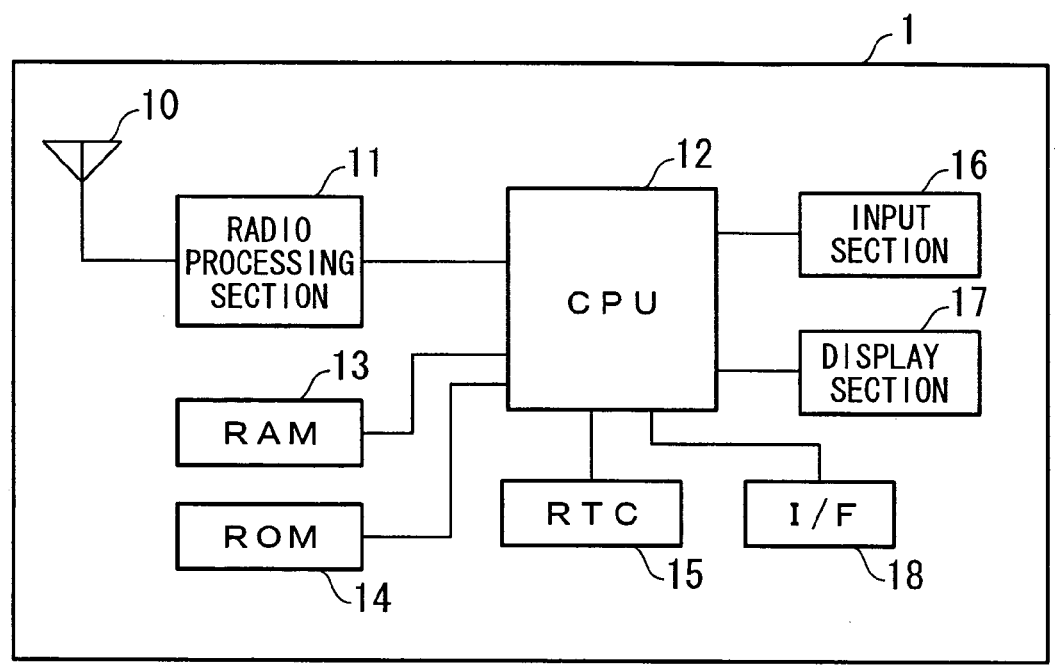
FIG. 1 is a block diagram for one embodiment of a portable phone in accordance with the invention.

FIG. 1 is a block diagram for a portable phone as one embodiment of a communication terminal in accordance with the invention. In FIG. 1, a portable phone 1 includes the following elements: an antenna 10 to be used for radio communication with a base station; a radio processing section 11 for performing radio processing in a HRPD system; a CPU 12 for performing the processing of a radio communication protocol in the HRPD system and various kinds of processings inside of the portable telephone; a RAM 13; a ROM 14; an RTC (Real Time Clock) 15 functioning as a timer; an input section 16; a display section 17; and an I/F 18 as an interface for connecting external peripheral instruments. A UATI and effective area information for the UATI are stored in a nonvolatile memory (static RAM) in the RAM 13 or the ROM 14 (in the case of an EEPRROM).

Effective time for the UATI (for example, 54 hours) is measured by counting the RTC 15.

Figure 2:
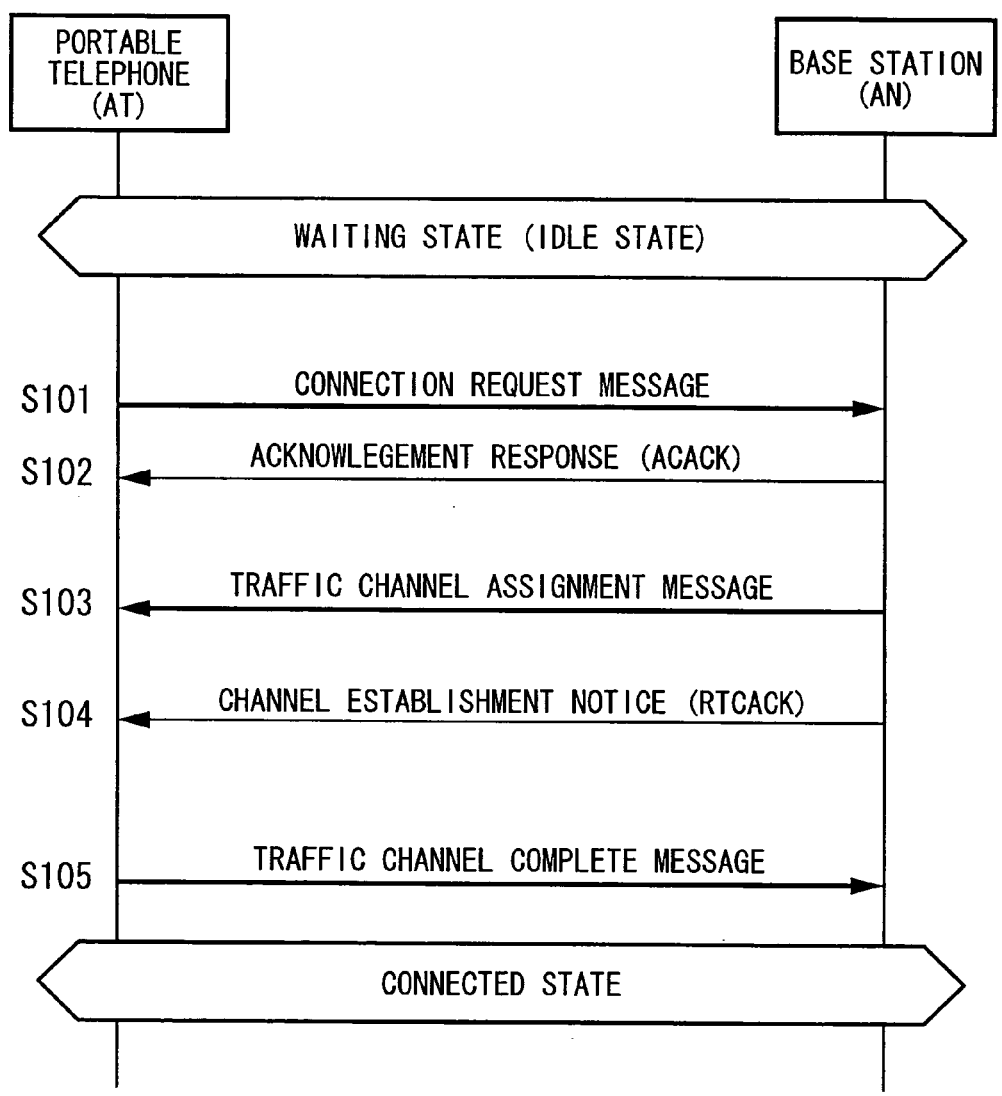
FIG. 2 is a procedural diagram for a basic call connection in a HRPD system.

FIG. 2 shows a procedure 1 for a basic call connection in a HRPD system. A portable telephone (AT) that begins a call connection in a waiting state (idle state) first transmits a connection request message to a base station (AN) as a connection request (Step 102). In the HRPD system, a device such as a communication terminal is called an access terminal (AT), while a device such as a base station is named an access node (AN).

With regard to a radio signal from the portable telephone (AT) to the base station (AN), an access probe control is applied to avoid interference with other portable telephones. The portable telephone (AT), following the access probe control, first begins transmission with low transmission power, and gradually increases the transmission power. When the base station (AN) receives a radio signal from the portable telephone (AT), the base station (AN) returns an acknowledge response (AcAck) (Step 102) in order to stop the increasing of the transmission power from the portable telephone (AT) since the base station does not need to increase the transmission power.

When the portable telephone (AT) receives the acknowledge response (AcAck) from the base station (AN), the portable telephone (AT) suspends the increase in the transmission power so that the communication between the base station (AN) and the portable telephone (AT) is carried out on the transmission power currently being transmitted.

Next, the base station (AN) analyzes the message received from the portable telephone (AT) at Step 101, and transmits a traffic channel assignment message to the portable telephone (AT) (Step 103).

In receiving the traffic channel assignment message, the portable telephone (AT) performs a reception setup of a downstream traffic channel under the radio condition specified by the traffic channel assignment message, and then begins to establish a upstream traffic channel. When the base station (AN) receives a signal for the upstream traffic channel, the base station (AN) delivers a channel establishment notice (RTCAck) to notify that the upstream traffic channel has been established (Step 104).

When the portable telephone (AT) receives the channel establishment notice (RTCAck) from the base station (AN), the portable telephone (AT) tells the base station (AN) through a traffic channel complete message that the upstream and downstream have been set up (Step 105).

According to the procedure described above, the portable telephone (AT) is connected with the base station (AN).

Figure 3:
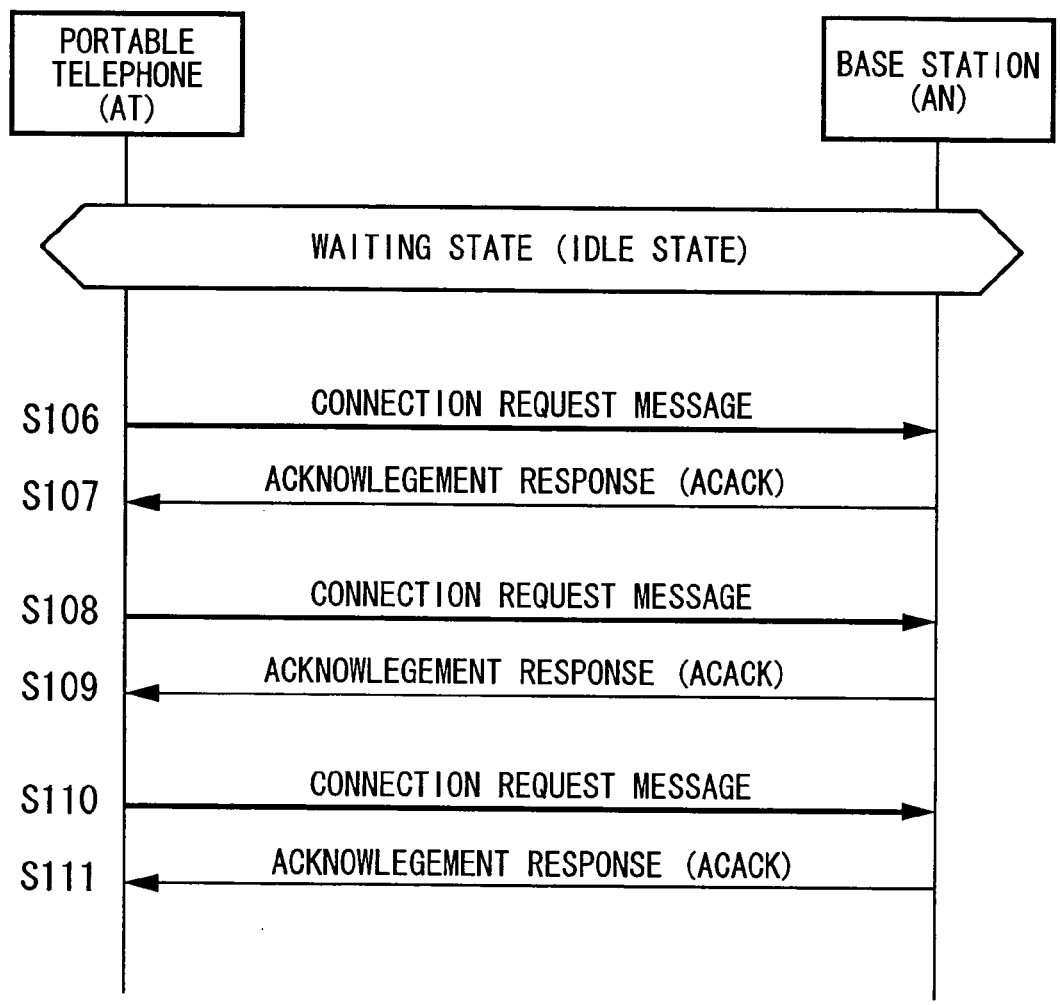
FIG. 3 is a procedural diagram for explaining a case in which disagreement of a UATI takes place.

FIG. 3 illustrates a case when a disagreement of the UATI happens in a radio sequence of the HRPD system. When the base station (AN) receives a connection request message from the portable telephone (AT) (Step 106), the base station (AN) sends out an acknowledgement response (AcAck) to the portable telephone (AT) (Step 107). However, a message that detected an inappropriate UATI at the time of analyzing the message is destroyed.

On account of this, transmission of a connection request message to the base station (AN) from the portable telephone (AT) and transmission of an acknowledgement response to the portable telephone (AT) from the base station (AN) are repeated, respectively (Step 108-Step 111). This situation disenables the connection between the portable telephone (AT) and the base station (AN) till the UATI is changed.

Figure 4:
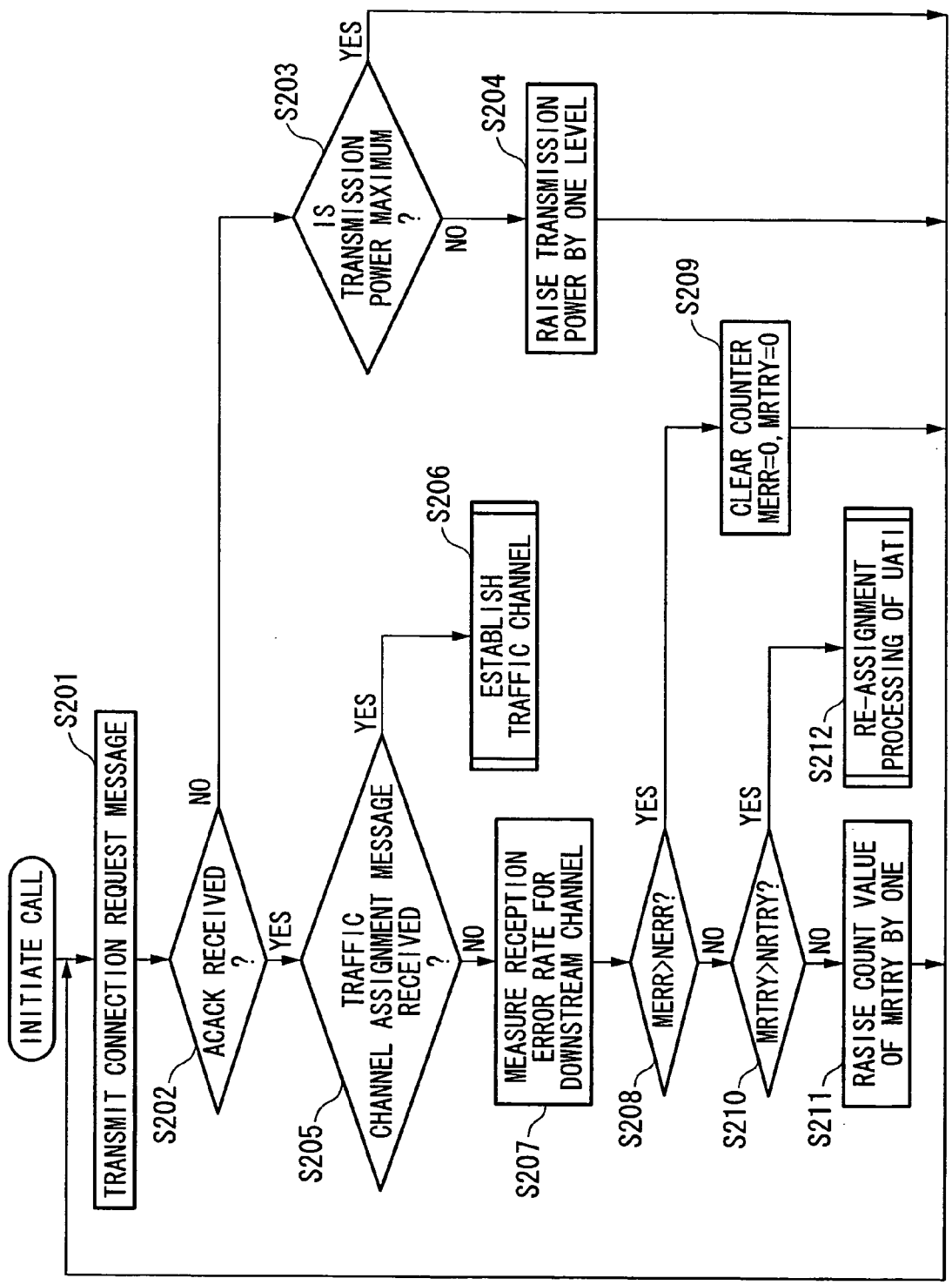
FIG. 4 is a flowchart for solving connection fault in accordance with the disagreement of the UATI.

FIG. 4 illustrates a procedure for solving connection failure in accordance with the invention, caused by a disagreement of a UATI when the disagreement of the UATI occurs.

When the portable telephone (AT) delivers a connection request message to the base station (AN) (Step 201), an acknowledgement response (AcAck) for confirming whether a signal has reached the base station (AN) is supposed to be received (Step 202). In a case where no acknowledgement response (AcAck) is received for a fixed period of time, it is determined that the signal did not reach the base station (AN). Another transmission having greater transmission power by one level is tried (Steps 203 and 204). When no acknowledgement response (AcAck) is received, transmission power is increased up to a maximum level (Steps 203 and 204).

When, at Step 202, an acknowledgement response (AcAck) is received, it is determined that a connection request message has reached the base station (AN). Next, it is determined whether a traffic channel assignment message requested by the connection request message is received (Step 205). Then, when the traffic channel assignment message from the base station (AN) is received within a fixed period of time, establishment of a traffic channel is performed (Step 206).

In a case that no traffic channel assignment message is received within a predetermined period of time, a CRC (Cyclic Redundancy Check) error occurrence rate (Merr) for the packets received in a physical layer is confirmed (measured) (Step 207), because it is considered that there is a problem in a received signal environment or that a disagreement has occurred in the UATI.

When the reception error occurrence rate (Merr) is in excess of a predetermined value (Nerr), it is considered that a poor reception signal environment caused reception failure. Accordingly, once again, the connection request message is transmitted (Steps 208 and 209).

When the reception error occurrence rate (Merr) is below the predetermined value (Nerr), it is determined that there is no problem in a reception signal environment, and that the possibility of a disagreement of the UATI is high. Then, the number of occurrences of connection failure is counted under the signal condition (Steps 210 and 211). In a case where the count value (Mretry) exceeds a predetermined value (Nretry), it is determined that the UATI has a problem, which executes re-acquisition processing of the UATI (re-assignment processing of the UATI) (Steps 212).

Since the disagreement of the UATI between the base station (AN) and the portable telephone (AT) is settled after the re-acquisition processing of the UATI, the situation where a radio condition is good and a channel connection cannot be established is solved.

Figure 5:
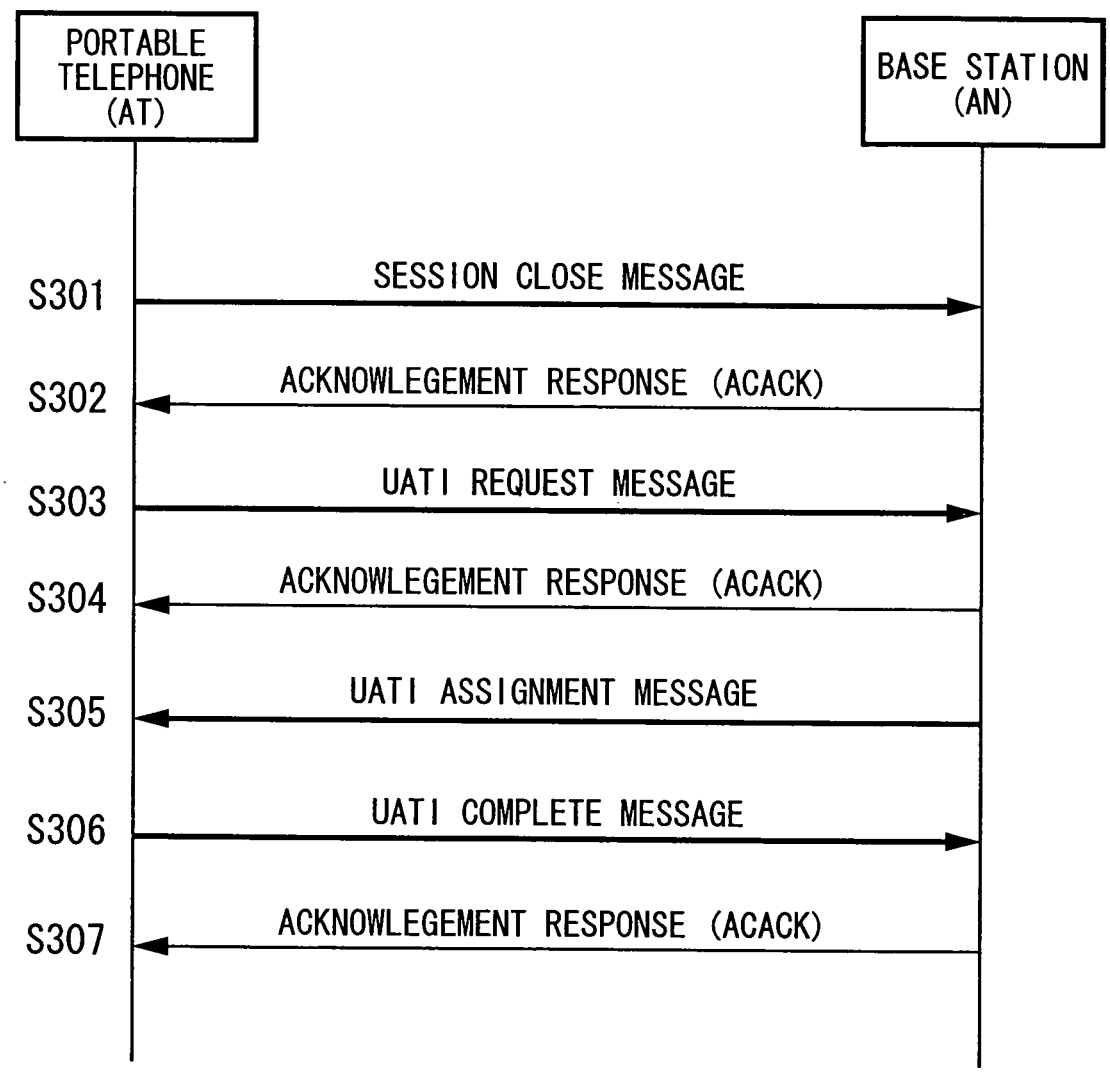
FIG. 5 is a procedural diagram for providing another UATI.

FIG. 5 shows a procedure for re-acquisition processing of the UATI. A session close message is transmitted for closing a session connection processing from the portable telephone (AT) to the base station (AN) (Step 301). When the base station (AN) receives the session close message, the base station (AN) sends out an acknowledgement response (AcAck) to the portable telephone (AT) (Step 302).

Next, the portable telephone (AT) transmits a UATI request message to the base station (AN) (Step 303). The base station (AN) sends back an acknowledgement response (AcAck) in response to the UATI request message (Step 304).

Then, the base station (AN) transmits a UATI assignment message to the portable telephone (AT) (Step 305). The portable telephone (AT) obtains a new UATI from the UATI assignment message received from the base station (AN), and registers the new UATI inside. Moreover, the portable telephone (AT) transmits a UATI complete message to the base station (AN) (Step 306).

The base station (AN) receives the UATI complete message from the portable telephone (AT), and confirms that the portable telephone (AT) has acquired a new UATI to transmit an acknowledgement response (AcAck) to the portable telephone (AT) (Step 307).

From the procedures described above, the portable telephone (AT) obtains a new UATI, which enables a communication connection with the base station (AN).

An explanation is given of the portable telephone as one embodiment of the invention. However, the invention is not limited to portable telephones. Instead, the invention applies not only to a PDA (Personal Digital Assistant) but also to other kinds of communication terminals such as hand-held computers.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A communication terminal in a wireless communication system including a base station that assigns a terminal identification information to each communication terminal, the terminal identification information being used for identifying each communication terminal, the communication terminal comprising:

a transmitter/receiver unit that transmits and receives any type of information through wireless communication;

a controller that measures a reception error occurrence rate within packets received at the communication terminal and then determines a cause of the traffic channel connection failure between terminal identification information disagreement and poor signal reception based on the measured reception error rate within the packets received at the communication terminal;

a wireless processing unit that transmits and receives information through wireless communication;

a storage unit that stores the terminal identification information;

a communication connection request transmission unit that transmits, via the wireless processing unit, a communication connection request to the base station to assign a traffic channel to the communication terminal; and a terminal identification information re-assignment request unit that requests, via the wireless processing unit, re-assignment of the terminal identification information to the base station when no response of information necessary for communication connection from the base station is received with respect to the communication connection request after the wireless processing unit transmits a session dose message to the base station.

2. The communication terminal as recited in claim 1, wherein the controller confirms a reception error occurrence rate of a received signal when communication connection with the base station is not completed, and when the reception error occurrence rate is below a predetermined value, the controller controls the transmitter/receiver unit so that the transmitter/receiver unit transmits, to the base station, a re-assignment request for re-assigning the terminal identification information to the communication terminal.

3. A communication terminal in a wireless communication system including a base station that assigns a terminal identification information to each communication terminal, the terminal identification information being used for identifying each communication terminal, the communication terminal comprising:

a transmitter/receiver unit that transmits and receives any type of information through wireless communication;

a controller that controls the transmitter/receiver unit;

a wireless processing unit that transmits and receives information through wireless communication;

a storage unit that stores the terminal identification information;

a communication connection request transmission unit that transmits, via the wireless processing unit, a communication connection request to the base station to assign a traffic channel to the communication terminal;

a terminal identification information re-assignment request unit that requests, via the wireless processing unit, re-assignment of the terminal identification information to the base station when no response of information necessary for communication connection from the base station is received with respect to the communication connection request, wherein the controller confirms a reception error occurrence rate of a received signal when communication connection with the base station is not completed, the controller repeats to generate a communication connection request to the base station when the reception error occurrence rate is below a first predetermined value, the controller counts the number of the communication connection requests generated, and the controller controls the transmitter/receiver unit so that the transmitter/receiver unit transmits the re-assignment request to the base station when the counted number is beyond a second predetermined value.

* * * * *